US008396196B2

(12) United States Patent
Sander et al.

(10) Patent No.: US 8,396,196 B2
(45) Date of Patent: Mar. 12, 2013

(54) TRANSFER OF MULTIPLE MICROPHONE SIGNALS TO AN AUDIO HOST DEVICE

(75) Inventors: Wendell B. Sander, Los Gatos, CA (US); David John Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 978 days.

(21) Appl. No.: 12/437,976

(22) Filed: May 8, 2009

(65) Prior Publication Data

US 2010/0284525 A1 Nov. 11, 2010

(51) Int. Cl.
*H04M 11/00* (2006.01)

(52) U.S. Cl. ............. 379/93.06; 379/90.01; 379/202.01; 381/74; 381/71.1; 455/556.1

(58) Field of Classification Search ............... 379/93.06, 379/90.01, 93.05, 202.01; 381/212, 74, 71.1; 704/226, 225, 228, E19.005, E21.002; 455/556.1
See application file for complete search history.

(56) References Cited

U.S. PATENT DOCUMENTS

| | | | | |
|---|---|---|---|---|
| 4,352,179 | A | 9/1982 | Dabney | |
| 2007/0098192 | A1 * | 5/2007 | Sipkema | 381/312 |
| 2008/0101576 | A1 * | 5/2008 | Vernick | 379/202.01 |
| 2008/0201138 | A1 * | 8/2008 | Visser et al. | 704/227 |
| 2009/0180659 | A1 | 7/2009 | Sander et al. | |
| 2010/0017205 | A1 * | 1/2010 | Visser et al. | 704/225 |
| 2010/0041358 | A1 * | 2/2010 | Wood | 455/226.3 |

OTHER PUBLICATIONS

"4-Channel HD Audio Codec with Quad Digital Microphone Interface", STAC9204/9205, IDT™ Datasheet, vol. 1.0, Dec. 2006, (23 pages).
"Akustica and Sigmatel Develop New Digital Microphone Array Solution for Notebook PCs", Akustica, Inc., Release, Seattle, Washington./WinHEC, May 22, 2006, (4 pages).
"MEMS Microphone Measures Two Millimeters Square", EETimes.com, Jul. 7, 2008, URL: http://www.eetimes.com/showArticle.jhtml?articleID=208802897, web page found at: http://www.eetimes.com/news/latest/showArticle.jhtml;jsession . . . , (1 page).
"Single-Chip Microphone on the Road to Digital", EETimes.com, May 29, 2006, URL: http://www.eetimes.com/showArticle.jhtml?articleID=188101111, web page found at: http://www.eetimes.com/showArticle.jhtml;jsessionid=BJNT . . . , (2 pages).
Sander, Wendell B., et al., "Electronic Device Accessory", U.S. Appl. No. 12/203,876, filed Sep. 3, 2008, First Named Inventor: Wendell B. Sander, (Whole Document).
Tashev, Ivan, et al., "Microphone Array for Headset with Spatial Noise Suppressor", Microsoft Research, One Microsoft Way, Redmond, WA 98052, USA, Jun. 2005, (5 pages).

* cited by examiner

*Primary Examiner* — Melur Ramakrishnaiah
(74) *Attorney, Agent, or Firm* — Blakely, Sokoloff, Taylor & Zafman LLP

(57) ABSTRACT

An audio communications host device has a communications network interface, digitizing circuitry, and a headphone jack. A demultiplexer has an input coupled to receive a signal from a pin of the headphone jack, and multiple outputs coupled to inputs of the digitizing circuitry, respectively. An uplink audio processor receives digitized microphone signals from multiple outputs of the digitizing circuitry, and in response delivers an uplink signal to the communications network interface. The uplink signal contains audio from one or more of the digitized microphone signals. Other embodiments are also described and claimed.

23 Claims, 4 Drawing Sheets

TRANSFER OF MULTIPLE MICROPHONE SIGNALS TO AN AUDIO HOST DEVICE

An embodiment of the invention is directed to a technique for transferring multiple microphone signals from a headset to an audio host device, such as a mobile smart phone. Other embodiments are also described.

BACKGROUND

Mobile smart phones are increasingly being used in situations that call for hands-free communication. As a result, mobile phone users are now using headsets with cables that can be plugged into a headphone jack of the mobile phone. Typical headset designs have a single microphone that is located as near the user's mouth as possible, when the headset is worn, e.g. at the tip of a microphone boom or attached to one of the cables that connect to an earphone of the headset. This positioning however is generally not as good as being very close the user's mouth, often causing a decrease in the signal to noise ratio (SNR) of the speech signal that has been captured or picked up by the microphone. Coupled with the fact that most users often have conversations using their mobile phones in noisy environments, the fidelity of the captured speech signal is often very poor.

One way to improve the performance of sound capture by the headset during a two-way communications or phone call application is to capture the near end user's speech using multiple microphones. This arrangement is also referred to as a microphone array. The processing of microphone array signals improves the SNR of the resulting microphone signal, by spatially filtering the ambient sound field around the near end user. In other words, the array is "pointed" toward the signal of interest, by emphasizing contributions from the better placed microphones while deemphasizing those of the poorly placed microphones. Microphone array processing may also be used in conjunction with a noise cancellation algorithm to more effectively reduce the ambient noise that is captured by the microphones.

Headsets with built-in microphone arrays may also perform better when being used for media playback applications, e.g. while the user is listening to a locally playing MP3 music file, or streaming video over the Internet. In that case, microphone array processing may enhance the noise cancellation algorithm to alleviate the impact of acoustic leakage of ambient noise into an earphone of the headset.

Microphone array processing may be performed within the so-called host device, e.g. the mobile phone handset unit or the digital media player device, by taking advantage of available central processing unit (CPU) data processing power within the host device. To deliver the microphone signals from the headset to the host device, a multi-channel audio codec with a digital microphone interface may be used. The digital microphone interface permits the connection of digital microphones in the headset, to a codec chip within the host device, via a multi-pin cable interface where each pin carries either a single microphone data channel or a reference clock signal (the latter being used for timing purposes to ensure correct sampling of the microphone data signal received by the host device).

SUMMARY

An embodiment of the invention is a technique for transferring multiple, analog microphone signals over a single-wire interface to an audio host device, such as a smart phone, an MP3 player device, or a desktop or laptop personal computer. On the headset side, a microphone signal transfer circuit includes a multiplexer having multiple inputs to receive multiple, analog microphone signals, respectively. An output of the multiplexer is coupled to the input of a voltage to current converter. An output of the voltage current converter is in turn coupled to a single, microphone signal line that runs to the host side. Power supply current may be provided to the multiplexer and the voltage to current converter, by a voltage regulator that is running off the microphone signal line. In other words, the microphone signal line not only transfers the microphone signal data from the headset side, but also provides DC current from the host side, to supply power for running the microphone signal transfer circuit. The multiplexer rapidly switches its output from being connected with one of its inputs to another, in accordance with a sufficiently high reference frequency, e.g. at least 10 kHz. The output signal of the multiplexer thus contains the sampled multiple microphone signals. The output voltage signal is converted into a corresponding sequence of current variations on the microphone signal line.

The current variations on the microphone signal line are then detected at the host side as voltage variations, using a demultiplexer whose input is connected to the microphone signal line and whose outputs deliver samples of the microphone signals, respectively. To do so, the demultiplexer may switch its input, from being connected with one of its outputs to another one of its outputs, in accordance with the same reference frequency that was used by the multiplexer in the headset side. The analog outputs of the demultiplexer are then digitized and fed to an audio processor. The latter may perform microphone array processing upon the digitized microphone signals. Depending on the application running in the host device, the audio processor may produce for example an uplink signal that is then fed to a communications network interface of the host device (e.g., a telephony application), or an audio signal that represents playback of a digital media file (e.g., a local MP3 player application or an Internet streaming video player).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
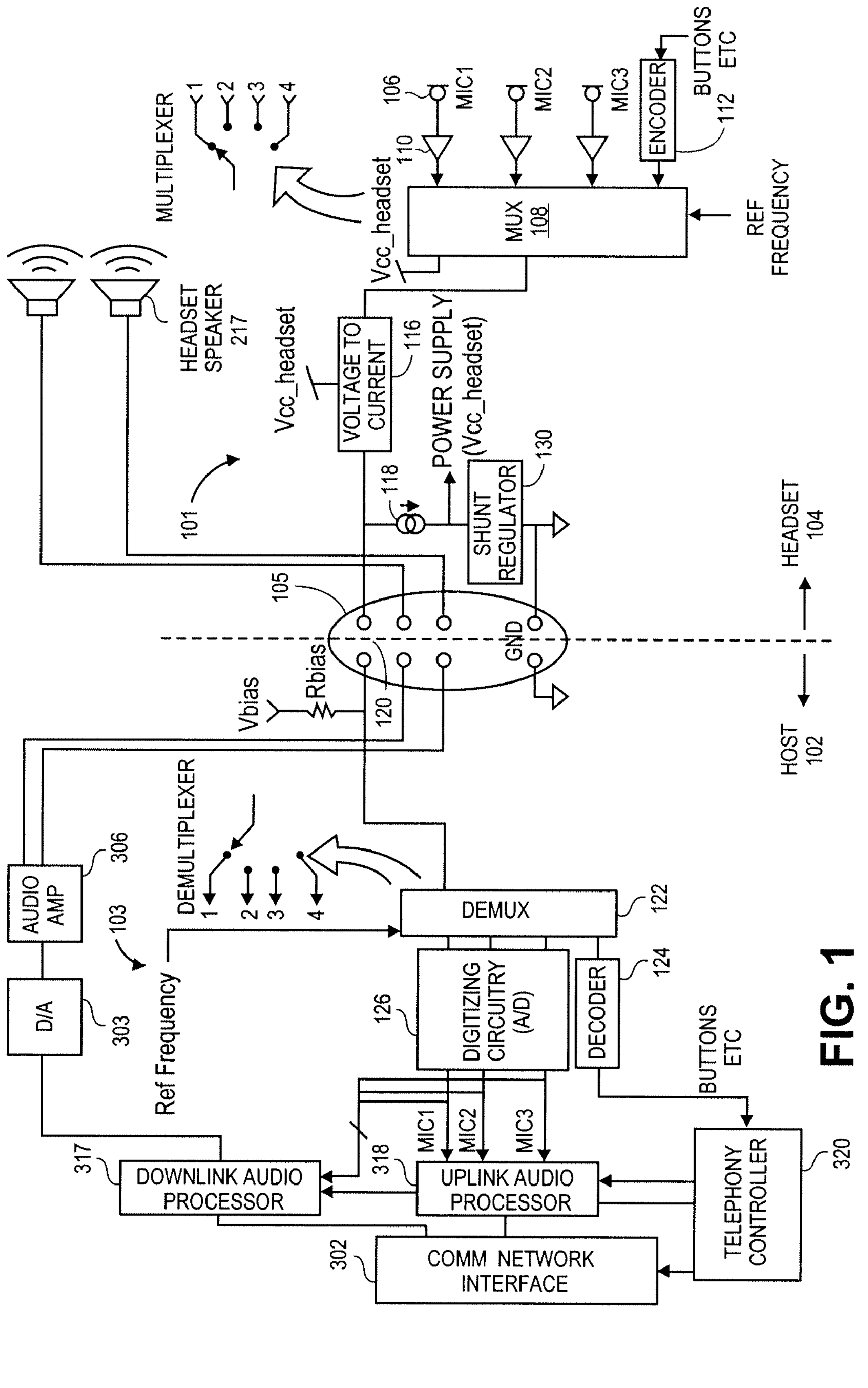
FIG. 1 is a circuit schematic of a system wherein multiple microphone signals are transferred from a headset to an audio communications host device, in accordance with an embodiment of the invention.
Figure 4:
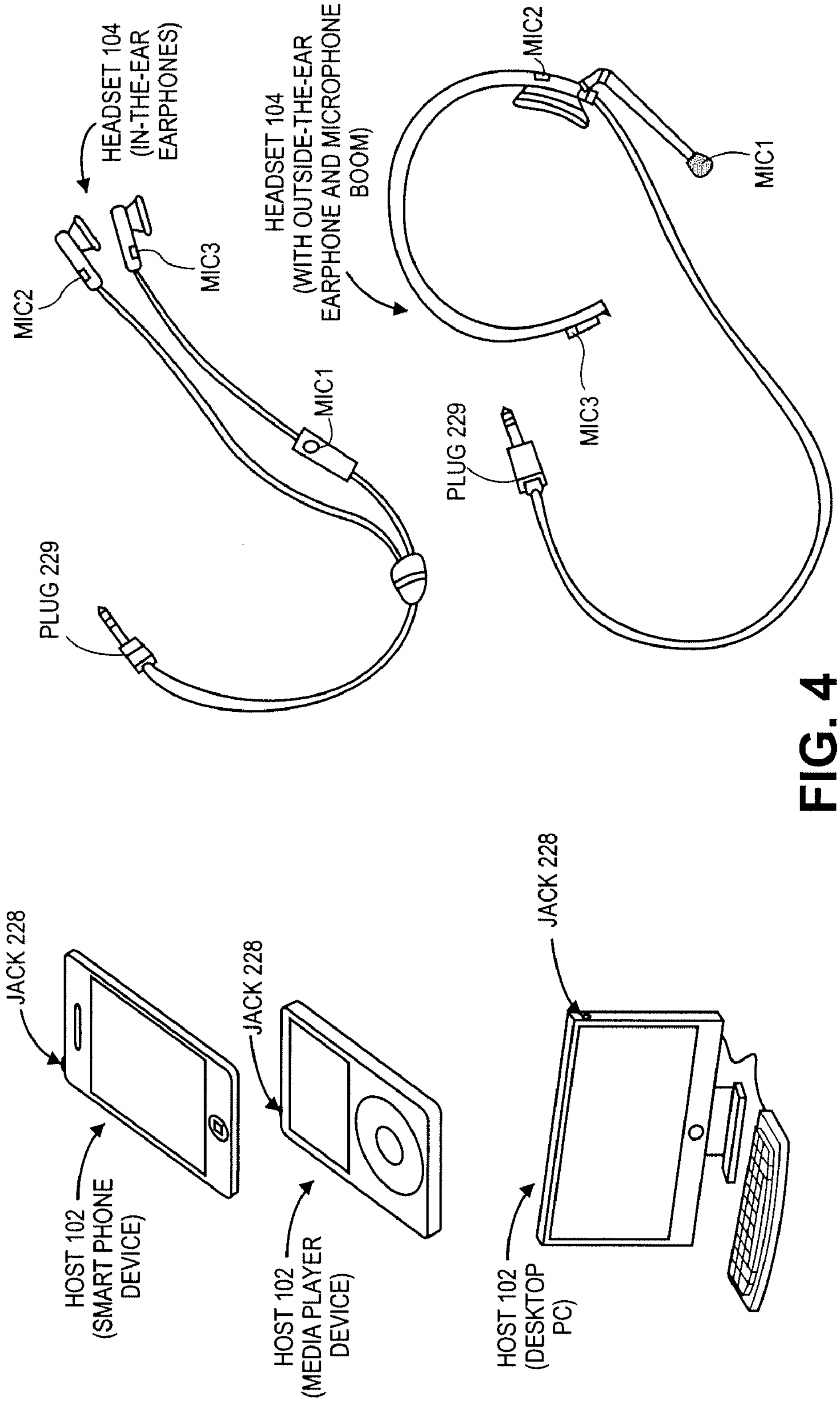
FIG. 4 shows various examples of host devices and headsets in which an embodiment of the invention may appear.

FIG. 1 is a circuit schematic of a system wherein multiple microphone signals can be transferred from a headset 104 to an audio host device 102, in accordance with an embodiment of the invention. FIG. 4 shows several types of host devices 102 (including a multi-function smart phone, a dedicated media player, and a desktop personal computer) and two types of headsets 104, in which various embodiments of the invention can be implemented. Returning to FIG. 1, in this example, the host 102 is an audio communications device, such as a smart phone or an Internet-connected personal computer, that has a communication network interface 302. The communications network interface 302 may have a circuit that transmits an uplink signal created by an uplink audio processor 318. The network interface 302 may transmit the uplink signal using, for example, a cellular telephony network protocol to a cellular base station (e.g., where the ongoing telephone call is a cellular phone call), a wireless local area network protocol (WLAN) protocol to a WLAN base station (e.g., where the ongoing call is in a voice over Internet protocol, VOIP), or a wired local area network protocol (e.g., wherein the ongoing call is a VOIP call over a local Ethernet segment). The uplink audio signal contains part of the conversation of an ongoing telephone call, between a remote or far-end user and a local or near-end user (the latter being the wearer of the headset 104). A telephone controller 320 manages the call, including set up and teardown of a two-way communication session between the communication network interface 302 and some, peer remote interface. The controller 320 also controls a downlink audio processor 317, which produces the downlink signal for the conversation. The downlink signal is then fed to a headset speaker 217 via a digital-to-analog converter 303, an audio amplifier 306, and a speaker line that may lie within an electrical or conductive interface 105.

The interface 105 connects a microphone signal transfer circuit 101 in the headset side, to a microphone signal transfer circuit 103 in the host side. The interface 105 includes a microphone signal line 120 and an associated power return or ground (GND) line. These wires may be part of a headset cable that includes one or more speaker lines, and at the end of which is a conventional headset plug 229 that is inserted into a mating headset jack 228 in the host 102 (see FIG. 2). The headset 104 also includes one or more earphones (also referred to as a headset speaker 217) whose inputs are to receive audio signals that are provided by the host 102, in this case through the interface 105 via respective speaker signal lines. For example, the input of the headset speaker 217 may be coupled to a pin of the headset plug 229, which is to make contact with a corresponding pin of the headset jack 228, labeled as a left or right speaker signal line in FIG. 2.

The headset 104 has a number of microphones 106 (in this example, three) that may be built into or integrated into various locations of the headset. For example, MIC1 may be located at the end of a microphone boom, or it may be located on one of the earphone cables within a small housing. The latter may also include one or more switches or other mechanical actuators and their associated buttons. One or more other microphones, such as MIC2 and MIC3, may be located in one or more earphone cases, in the headband, or elsewhere on the headset, as needed to capture the various regions of the ambient sound field outside of the worn headset 104 (which include the local user's speech). The microphones 106 may have a usable frequency response range typical of consumer grade audio microphones (e.g., 20 Hz-5 kHz).

The analog audio signal produced by each microphone is fed to a respective input of a multiplexer 108. A variable gain amplifier 110 may be coupled between the multiplexer input and its associated microphone. The variable gain amplifier 110 may be used to make manual or automatic adjustments to the microphone signals that are delivered to the host 102, as explained below in a further embodiment of the invention.

As depicted in FIG. 1, the multiplexer 108 may be viewed as a switch that moves in sequence from one input to another at a sufficiently high rate defined by a reference frequency, thereby effectively sampling each microphone signal at its output. The multiple microphone signals are thus said to be multiplexed onto the single output. In other words, the multiplexer 108 is to switch its output from being connected with one of its inputs to another one it its inputs, in accordance with a reference frequency that is at least 10 kHz. The reference frequency is in effect a sampling frequency for sampling the microphone signals, and as such should be selected to be as high as practical to reduce aliasing. In addition, as the number of microphones increase, the reference frequency should also be increased to ensure a sufficiently high sampling rate for each microphone signal.

The output of the multiplexer is coupled to the input of a voltage-to-current converter 116. The latter circuit serves to translate, in essence, a voltage signal to a current signal, producing current variations in the microphone signal line 120. The current on the microphone signal line 120 may be provided by a source in the host 102, depicted as a voltage source Vbias that feeds the microphone signal line 120 through a resistor Rbias. Another path to the microphone signal line 120 is provided to a constant dc current sink 118 which feeds a shunt regulator 130, the latter producing a power supply voltage Vcc_headset that provides power supply current to the multiplexer 108 and to the voltage to current converter 116. The resistor Rbias should be selected to pass sufficient current needed to power the microphone signal transfer circuit 101. This arrangement allows not only power supply to be provided through the microphone signal line 120, but also that the current variations produced by the voltage-to-current 116 be detected as voltage variations at the input of a demultiplexer 122 in the host 102.

Before describing the microphone signal transfer circuit 103 (host side) and how the multiplexed microphone signals can be recovered, a further embodiment of the invention is described. This embodiment allows essentially the same microphone signal transfer circuit 101 in the headset 104 to be used not just to transport multiple microphone signals over a single wire interface, but multiple switch actuation signals as well. In that embodiment, the headset 104 may include one or more switches (or another type of mechanical to electrical transducer having a button) that is coupled to the input of an encoder circuit 112. The encoder 112 produces an actuation signal in response to the one or more switches being actuated (e.g., a button being pressed or moved by the user wearing the headset), and this signal is supplied to a further input of the multiplexer 108. This actuation signal is sampled by the multiplexer 108, by treating the further input as yet another signal to sample in accordance with the reference frequency. In other words, the actuation signal value (representing the status of one or more buttons in the headset 104) is multiplexed onto the same microphone signal line 120. At the host side, the actuation signal may be recovered by the microphone signal transfer circuit 103 using a corresponding decoder circuit 124 to be described below.

To recover the microphone signals in the host side, a demultiplexer 122 is provided that may perform in essence the reverse of the operation of multiplexer 108. The multiplexer 108 switches its single input from being connected with one of its outputs to another, in accordance with the reference frequency. In other words, the demultiplexer 122 repeatedly connects its input to its outputs one at a time, and in accordance with the reference frequency, so as to extract multiple microphone signals from the signal on the microphone signal line 120. The analog signals at the outputs of the demultiplexer 122 are then digitized by the digitizing circuitry 126 and fed to the uplink audio processor 318. The latter in turn uses the digitized microphone signals to help improve the quality of the uplink speech signal for the two-way conversation (e.g., using microphone array processing techniques to reduce noise or improve SNR of the uplink signal, which contains speech of the local user or wearer of the headset 104).

The uplink audio processor 318 may include a chain of digital signal processing components that operate upon the audio content within one or more of the digitized microphone signals. These components may include an echo and noise canceller, a noise suppressor, an audio beam former, a programmable gain amplifier, and an energy limiter. For the two-way conversation, the associated downlink audio processor 317 in the host 102 is responsible for improving the quality of the audio signal from the far end or remote user, before delivering the signal to drive a speaker that is local to the host 102 (e.g., the headphone speaker 217 that is integrated in the headset 104). The downlink processor 317 may perform typical audio signal improvement functions such as echo cancellation, noise cancellation and side tone generation (e.g., using one or more of the multiple microphone signals MIC1-MIC3), to improve the quality of the sound heard by the local user.

In the instance where the microphone signal transfer circuit (headset side) 101 contains an encoder 112 that encodes multiple button actuation signals, a corresponding decoder 124 may be added to the microphone signal transfer circuit (host side) 103, to perform essentially the reverse operation, i.e. to recover the individual button actuation signals. In other words, in that case, the demultiplexer 122 extracts a control signal (as opposed to an audio microphone signal) from the signal on the microphone signal line 120, and provides the extracted control signal at its further output (coupled to the input of the decoder 124). This extracted control signal may indicate, for example, that a headset-integrated switch has been activated. For example, the wearer of the headset 104 could press a button of the switch, to signify that an ongoing telephone call be disconnected. The latter action may then be taken by the telephony controller 320 in the host 102.

Figure 2:
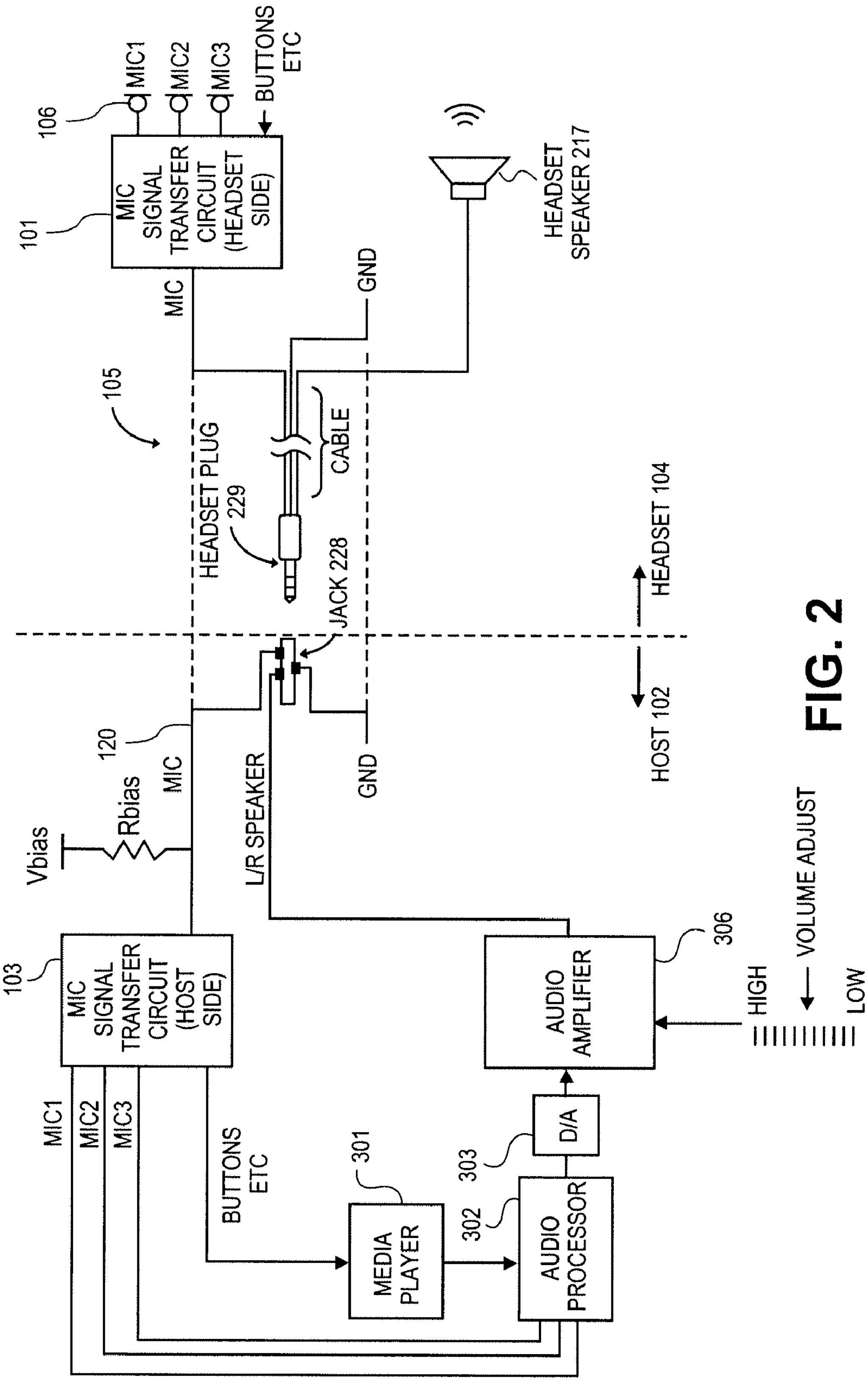
FIG. 2 is a circuit schematic of another embodiment of the invention, wherein multiple microphone signals are transferred from a headset to an audio host device featuring a media player.

Turning now to FIG. 2, this is a circuit schematic of another embodiment of the invention, where the multiple microphone signals are transferred this time to an audio host device 102 that features a media player 301. This may be an arrangement where, for example, in a multi-function smart phone, a music or video file is to be played back by the media player 301 through the headphone speaker 217. The media player 301 may be a digital media player, such as an MP3 player or an MPEG4 player that produces an audio signal representing playback of a music or video file, respectively. An audio processor 302 performs a noise reduction process (e.g., an ambient noise cancellation process) upon the audio signal produced by the media player 301, based on the digitized microphone signals provided by the microphone signal transfer circuit (host side) 103. The resulting improved audio signal, at the output of the audio processor 302, is then converted to analog form by a digital-to-analog converter 303, prior to being fed to an audio amplifier 306. The audio amplifier 306 amplifies the input signal in accordance with a volume adjust setting of the host 102, and, in this case, drives a left or right speaker line of the headset jack 228, the latter being in contact with a corresponding pin of the headset plug 229 that connects with the headphone speaker 217.

In a further embodiment, the media player 301 may be controlled by the wearer of the headset 104 pressing a button that is associated with a switch or other mechanical transducer in the headset 104. As explained above, an actuation signal produced by such a switch is multiplexed onto the microphone signal line 120 by the microphone signal transfer circuit (headset side) 101. The signal is then detected by the microphone signal transfer circuit (host side) 103. In particular, a decoder 124 (see FIG. 1) determines, for example, which of several buttons has been pressed, and provides this information to the media player 301. For example, in response to a signal indicating that a first headset switch has been actuated, the media player 301 could pause playback of the digital media file. The signal could alternatively indicate that a second headset switch has been actuated, in response to which the volume could be raised or lowered.

Figure 3:
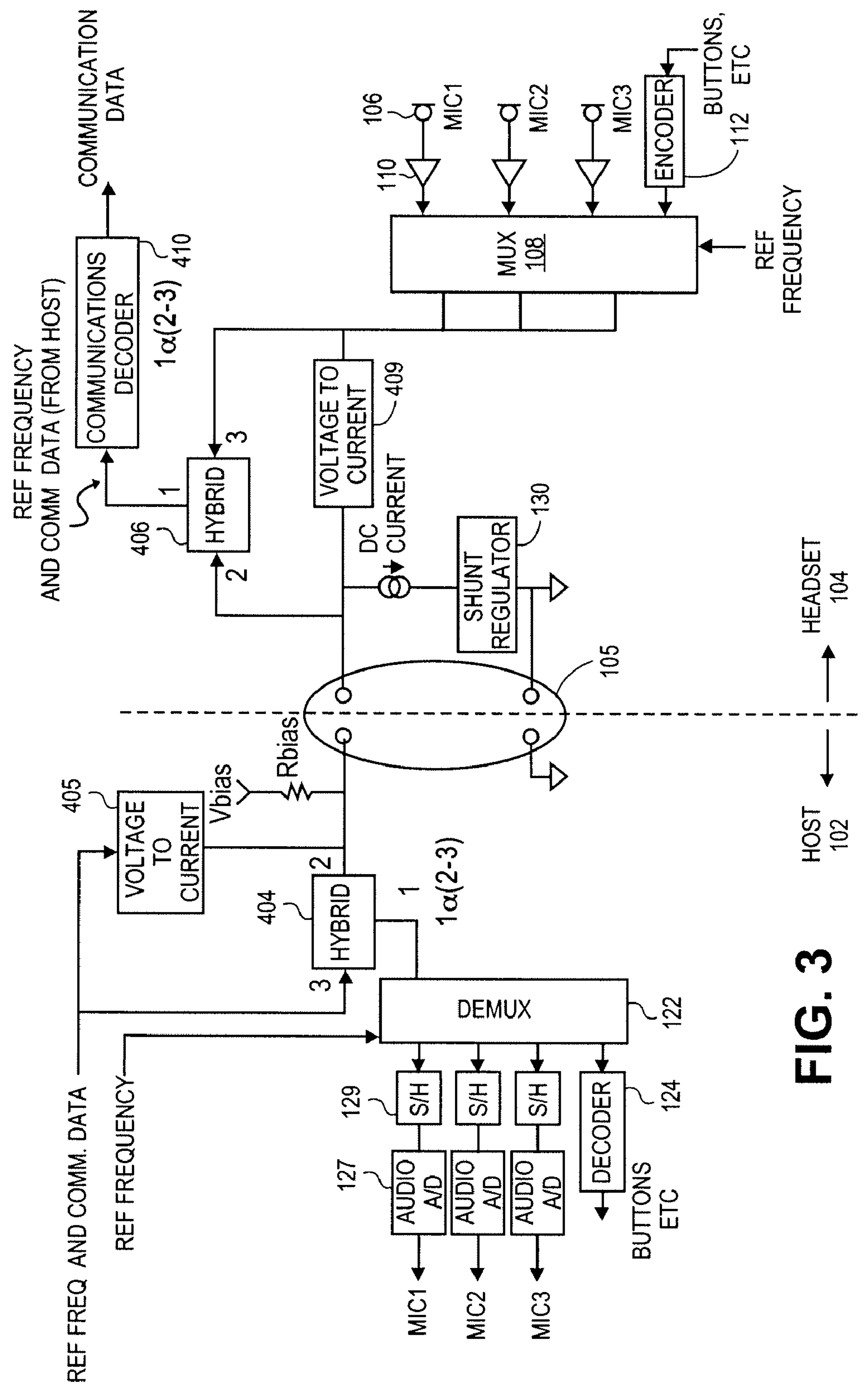
FIG. 3 is a circuit schematic of a system wherein communications data and a reference frequency may be transferred from the host device to the headset, in accordance with an embodiment of the invention.

The above description has not specifically addressed how the same reference frequency can be reproduced in both the host 102 and in the headset 104. Turning to FIG. 3, this is a circuit schematic of a system wherein the reference frequency may be generated in the host 102 and then essentially transferred to the headset 104, in accordance with an embodiment of the invention. In the host side, a hybrid 404 is provided having first, second and third ports as shown. A signal produced by the hybrid 404 at port 1 is proportional to subtracting a signal at its port 3 from a signal at its port 2. The hybrid 404 is coupled between (a) the input of the demultiplexer 122 at port 1 and (b) the microphone signal line of the interface 105 at port 2. Port 3 is to receive a signal bearing the reference frequency, which may be generated in the host 102.

In addition to the hybrid 404, a voltage to current converter 405 is provided in the host 102, to transfer the reference frequency onto the microphone signal line, as a current variation. The converter 405 has an input coupled to receive a signal bearing the reference frequency, and an output coupled to the microphone signal line. Thus, the microphone signal line current variation will contain not only multiple microphone signals from the headset side, but also the reference frequency from the host side.

To extract the reference frequency in the headset side, a second hybrid 406 is used as shown, having first, second and third ports. A signal produced by the hybrid 406 at port 1 is proportional to subtracting a signal at port 3 from a signal at port 2. The hybrid 406 is coupled between (a) the output of the multiplexer 108 at port 3 and (b) the microphone signal line at port 2. The reference frequency appears in a signal produced by the hybrid at port 1.

FIG. 3 also shows another embodiment of the invention, where the microphone signal line is used to transport communications data from the host side to the headset side. The communications data may include, for example, commands for adjusting or controlling the gain of the variable gain amplifiers 110 in the headset 104. To achieve this, a signal containing the communications data may be combined or encoded with the signal containing the reference frequency, to result in a signal bearing both the reference frequency and the communications data. The latter, combination signal is then fed to the voltage to current converter 405 in the host 102, which produces corresponding current variations in the microphone signal line.

To extract the communications data in the headset side, a communications decoder 410 is used that can in effect undo the encoding that was done in the host side when combining the communications data with the reference frequency. The input of the decoder 410 is coupled to port 1 of the hybrid 406 at which the combination signal containing the ref frequency and the communications appears. In that case, the communications decoder 410 may also have, in essence, a clock recovery circuit that produces, at a further output (not shown), the extracted reference frequency.

To conclude, various aspects of a technique for transferring multiple microphone signals from a headset to an audio host device have been described. While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the figures depict systems in which the headset has three microphones, the concepts of the invention are equally applicable to systems having in general two or more microphones that may be built into the headset. Also, the concepts of the invention are equally applicable to both stereo and mono headsets. The description is thus to be regarded as illustrative instead of limiting.

What is claimed is:

1. An audio communications host device, comprising:

a communications network interface;

digitizing circuitry having a plurality of inputs and a plurality of outputs;

a headphone jack having a first pin that is to make electrical contact with a corresponding first pin of a headphone plug;

a demultiplexer having an input coupled to receive a signal from the first pin of the headphone jack, and a plurality of outputs coupled to the plurality of inputs of the digitizing circuitry, respectively, wherein the demultiplexer is to switch the input, from being connected with one of said outputs to another one of said outputs, in accordance with a reference frequency; and an uplink audio processor to receive digitized microphone signals from the plurality of outputs of the digitizing circuitry, and in response produce and deliver an uplink signal to the communications network interface, wherein the uplink signal contains audio from one or more of the digitized microphone signals.

2. The audio communications host device of claim 1 wherein the reference frequency that is at least 10 kHz.

3. The audio communications host device of claim 2 further comprising:

a hybrid having first, second and third ports, wherein a signal produced by the hybrid at the first port is proportional to subtracting a signal at the third port from a signal at the second port, the hybrid being coupled between (a) the input of the demultiplexer at the first port and (b) the first pin of the headphone jack at the second port, wherein the third port is to receive a signal bearing the reference frequency and communication data; and a voltage to current converter having an input coupled to receive a signal bearing the reference frequency and said communication data, and an output coupled to the first pin of the headphone jack.

4. The audio communications host device of claim 1 wherein the demultiplexer is to repeatedly switch the input to each one of said plurality of outputs in accordance with the reference frequency, so as to extract a plurality of microphone signals from the signal on the first pin, the extracted microphone signals to appear at said plurality of outputs, respectively.

5. The audio communications host device of claim 4 further comprising:

a decoder having an input coupled to a further output of the demultiplexer, wherein the demultiplexer is to extract a control signal from the signal on the first pin, and provide the extracted control signal at said further output.

6. The audio communications device of claim 5 wherein the extracted control signal indicates that a headset-integrated switch has been activated.

7. The audio communications host device of claim 1 wherein the communications network interface comprises a radio circuit to transmit the uplink signal using a cellular telephony network protocol.

8. The audio communications host device of claim 1 wherein the communications network interface comprises a radio circuit to transmit the uplink signal using a wireless local area network protocol.

9. The audio communications host device of claim 1 wherein the uplink audio processor comprises a plurality of audio signal processing components that operate upon at least one of the digitized microphone signals, the audio signal processing components include at least one of a noise canceller, a noise suppressor and an audio beam former, that operates upon at least two of the digitized microphone signals.

10. The audio communications host device of claim 1 further comprising:

a hybrid having first, second and third ports, wherein a signal produced by the hybrid at the first port is proportional to subtracting a signal at the third port from a signal at the second port, the hybrid being coupled between (a) the input of the demultiplexer at the first port and (b) the first pin of the headphone jack at the second port, and the third port to receive a signal bearing the reference frequency; and a voltage to current converter having an input coupled to receive a signal bearing the reference frequency, and an output coupled to the first pin of the headphone jack.

11. The audio communications host device of claim 10 further comprising a constant dc voltage source coupled to the first pin of the headphone jack.

12. An audio host device, comprising:

a digital media player to produce an audio signal representing playback of a media file;

digitizing circuitry having a plurality of inputs and a plurality of outputs;

a headphone jack having a first pin;

a demultiplexer having an input coupled to the first pin of the headphone jack, and a plurality of outputs coupled to the plurality of inputs of the digitizing circuitry, respectively, wherein the demultiplexer is to switch the input from being connected with one of said outputs to another one of said outputs in accordance with a reference frequency; and an audio processor to perform a noise reduction process upon said audio signal based on a plurality of digitized microphone signals from the plurality of outputs of the digitizing circuitry.

13. The audio host device of claim 12 further comprising:

a digital to analog converter to convert the noise reduced audio signal from the audio processor into an analog audio signal; and an audio amplifier to amplify the analog audio signal at its output, wherein the output of the audio amplifier is coupled to a second pin of the headphone jack.

14. The audio host device of claim 12 further comprising a decoder having an input coupled to a further output of the demultiplexer, wherein an output of the decoder is to provide a signal that indicates whether or not a headset switch has been actuated.

15. The audio host device of claim 12 wherein the reference frequency is at least 10 kHz.

16. A method for operating an audio host device, comprising:

producing a plurality of microphone signals by switching an input, that is coupled to a microphone signal pin of a headphone jack, from being connected to one of a plurality of outputs, to being connected to another one of said plurality of outputs, in accordance with a reference frequency that is at least 10 kHz;

digitizing the plurality of microphone signals; and performing a noise reduction process upon an audio signal based on the plurality of digitized microphone signals.

17. The method of claim 16 wherein the audio signal contains playback of a digital media file, the method further comprising:

converting the noise reduced audio signal into an analog audio signal;

amplifying the analog audio signal; and driving a speaker signal pin of the headphone jack with the amplified analog audio signal.

18. The method of claim 17 further comprising:

producing an actuation signal by switching the input, that is coupled to the microphone signal pin of the headphone jack, from being connected to one of the plurality of outputs, to being connected to a further output, in accordance with the reference frequency; and decoding the actuation signal.

19. The method of claim 18 further comprising:

pausing playback of the digital media file in response to decoding the actuation signal.

20. The method of claim 16 further comprising:

applying the noise reduced audio signal to drive an earphone that is coupled to the headphone jack.

21. The method of claim 16 wherein the audio signal contains part of the conversation of an ongoing telephone call, the method further comprising:

applying the noise reduced audio signal to an earphone that is coupled to the headphone jack.

22. The method of claim 21 further comprising:

producing an actuation signal by switching the input, that is coupled to the microphone signal pin of the headphone jack, from being connected to one of the plurality of outputs, to being connected to a further output, in accordance with the reference frequency; and decoding the actuation signal.

23. The method of claim 22 further comprising:

disconnecting the ongoing telephone call in response to decoding the actuation signal.

* * * * *